Patented July 21, 1942

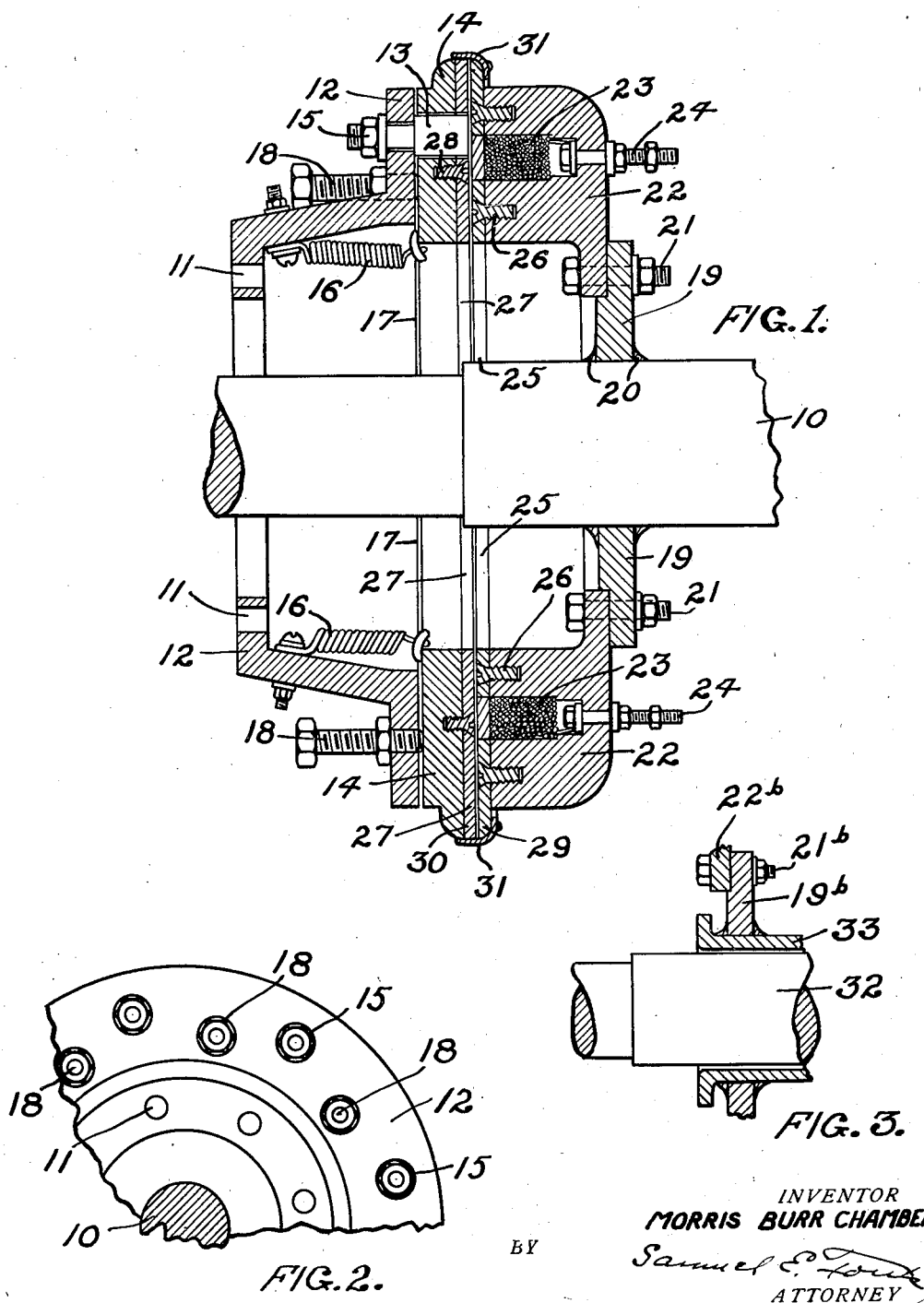

2,290,406

UNITED STATES PATENT OFFICE 2,290,406

BRAKE

Morris Burr Chambers, San Francisco, Calif.

Application September 10, 1940, Serial No. 356,140

4 Claims. (Cl. 188—164)

This invention relates to brakes which, while adapted to various relations, are perhaps most serviceable in automotive vehicles. For that reason, the following description and illustrations reveal the invention as applied to such a vehicle.

The principal object of the invention is the production of a brake which is simple in construction; is economical in manufacture; is reliable in service and capable of the greatest ease in control.

The simplicity of the invention is due principally to its few and easily constructed and assembled parts. But notwithstanding its simplicity, the brake is very powerful. The magnet and armature are ring-like elements which surround the axle of the wheel to be braked and they are active throughout their entire extent. For this reason, they act with tremendous power. Very seldom is it necessary to make any adjustments and the adjusting means are very simple and effective. The only parts which are susceptible to wear are the contacting faces of the magnet and armature rings and these faces can be so hardened as to make wear almost negligible.

The brake can be mounted about a non-rotatable or a rotatable shaft or axle and the accompanying drawing shows it with both of these mountings. While this application discloses specifically what I now consider the preferred structures, it is realized that details may be changed and the claims hereto annexed are not to be construed as limited to details any further than their specific terms and the prior art make necessary.

In the drawing, Fig. 1 is a sectional view through the brake taken parallel to the axle which, in this instance, is stationary or non-rotatable; Fig. 2 is an end view looking toward the right in Fig. 1; Fig. 3 is a fragmentary view showing how the magnet may be mounted about a rotatable shaft or axle, the magnet being secured to a housing which surrounds the axle.

Referring first to Figs. 1 and 2, 10 is a non-rotatable or fixed shaft, axle or spindle upon the left-hand end of which a wheel or pulley, not shown, is journaled. Secured to this wheel, as by bolts through holes 11, is an annular bell-shaped member 12 which, of course, turns with the wheel. Adjacent its outer periphery are a plurality of shouldered studs 13 which project to the right and carry the ring-shaped armature 14. The armature is provided with a series of apertures therethrough into which the studs 13 project. These studs are cylindrical and have diameters slightly smaller than the said apertures so that the armature may slide freely on the studs. The latter may be attached to the member 12 in any suitable way, as by threading the small ends to the left of the shoulders, inserting them through the member and clamping them in place by the nuts 15.

The armature 14 is drawn toward the member 12 by a series of light springs 16, the ends of which are attached to the armature and member. These springs will hold the armature flat against the radial wall 17 of the member or against the ends of adjusting bolts 18. If the contacting faces of the magnet and armature should wear so that the gap between them becomes excessive, the bolts 18 can be turned to take up the wear and maintain the width of the gap substantially constant. The bolts are screwed through the member 12.

As stated, the shaft or axle 10 of Figs. 1 and 2 is non-rotatable. To it is secured an annular flange 19. This may be welded in place, as indicated at 20. To this flange is secured, as by bolts 21, the magnet member 22, which is another annulus of substantially the same diameter as the armature 14. Within an annular cavity in the member 22 is a magnet coil 23, the ends of which are electrically connected to binding-posts 24 which extend outwardly through the member. As will be understood, current for energizing the magnet is supplied through these posts. When current is thus supplied, a strong magnetic field is instantly set up through and about the coil. The coil extends as close as is practicable to the face of the member 22 so that there will be as little reluctance as is possible to the lines of magnetic force which must jump the gap between the magnet and armature faces. These faces may be directly on and integral with the magnet and armature members, in which case all wear would come on the members. It is entirely feasible, however, to harden the contacting surfaces and thus reduce wear to a minimum. Better still it is, in my opinion, to cover these faces with separate plates of suitable hardness and make them easily removable. Thus, the magnet face is covered with a relatively thin annular plate 25 of hard but magnetizable material held by countersunk screws 26. In a similar way, the face of the armature member 14 is provided with a plate 27 which is held by screws 28.

By extending the outer periphery of the plate 25 and 27 somewhat beyond the general contour of the magnet and armature, as at 29 and 30, respectively, the areas of contact between the magnet and armature are increased and the brake made more powerful. To prevent dust and other foreign matter from entering the gap between the friction plates, I prefer to attach a guard member 31 to one or the other of the members 14 or 22 and extend it over the gap, as shown.

It is thought that the operation of the brake will be clear with but little explanation. When no current flows through the magnet coil, the armature is pulled back from the magnet so that a very narrow gap is formed between the friction plates and there is, of course, no braking action. Instantly the current is turned on, however, the armature is pulled toward the magnet and a powerful braking force is created.

Fig. 3 shows how the brake may be applied to a structure having a rotatable shaft or axle. In said figure the axle is shown at 32 and is meant to be one of the sections of the rear axle of an automotive vehicle. These axle sections rotate and turn the rear wheels of the vehicle. The brake proper is the same as is shown in Fig. 1. However, instead of securing the magnet member to the axle, it is secured to some suitable and non-rotatable part of the vehicle structure. As shown, 22$^b$ indicates a part of the magnet which is secured by bolts 21$^b$ to the annular member 19$^b$. This latter member is stationarily mounted upon a casing element 33 which is a part of the rear-axle housing.

Having described my invention, I claim:

1. A brake for a rotatable element which comprises an axle for the element, a magnet surrounding the axle, means for holding the magnet against rotation, said magnet having a ring-shaped surface facing toward the rotatable element, an armature having a ring-shaped surface facing the ring-shaped surface of the magnet, a member attached to the rotatable element and having a face adapted to form a limiting stop for the armature, resilient connections between the armature and member and tending to draw the armature sidewise toward the said limiting stop, a plurality of elements projecting from the said member and into apertures in the armature for supporting the armature and guiding it in its sidewise movement, wearing plates covering the facing surfaces of the magnet and armature, said plates being slightly spaced when the said resilient connections draw the armature toward the limiting stop, adjusting screws carried by said member and adapted to hold the armature spaced from the limiting stop to vary the space between the wearing plates, a circular coil of an electric conductor carried by the magnet, and means through which electric current may be supplied to said coil, whereby the magnet may be energized and the wearing plates drawn together.

2. A brake as set forth in claim 1 having a guard member surrounding the outer perimeters of the magnet and armatures and closing the space between the wear plates.

3. A brake for a rotatable element which comprises an axle for the element, a magnet surrounding the axle, means for holding the magnet against rotation, said magnet having a ring-shaped surface facing toward the rotatable element, an armature having a ring-shaped surface facing the ring-shaped surface of the magnet, a bell-shaped member adapted for attachment to the rotatable element concentric with the axle and having an outstanding flange with a surface adapted to form a limiting stop for the armature, resilient connections between the armature and the said bell-shaped member, a plurality of elements projecting from the said flange and into apertures in the armature for supporting the armature and guiding it in its sidewise movements, wearing plates covering the facing surfaces of the magnet and armature, said plates being slightly spaced when the said resilient connections draw the armature toward the surface forming the limiting stop therefor, adjusting screws carried by the flange of the bell-shaped member and adapted to hold the armature spaced from the limiting stop to vary the space between the wear plates, a circular coil of an electric conductor carried by the magnet, and means through which electric current may be supplied to said coil, whereby the magnet may be energized and the wearing plates drawn together.

4. A brake as set forth in claim 3 in which the wear plates are detachably affixed to the respective magnet and armature.

MORRIS BURR CHAMBERS.